Dec. 28, 1954 R. W. WALSH ET AL 2,697,960
FASTENER WITH RESILIENT ARMS HAVING CONNECTED ENDS
Filed May 26, 1953
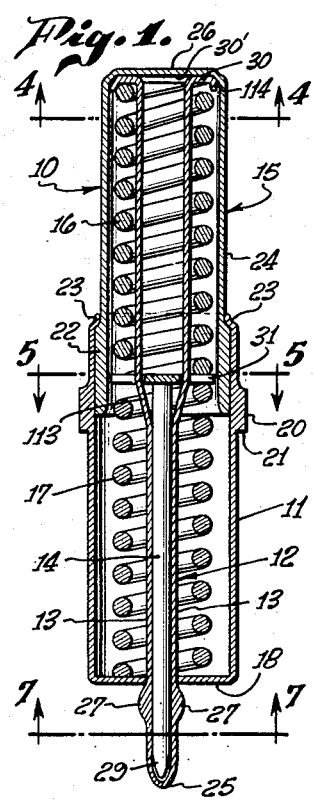
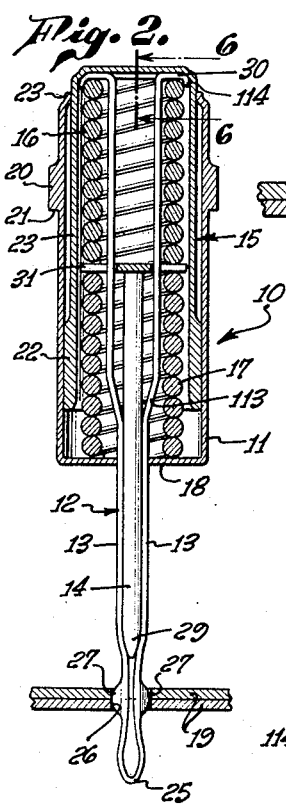
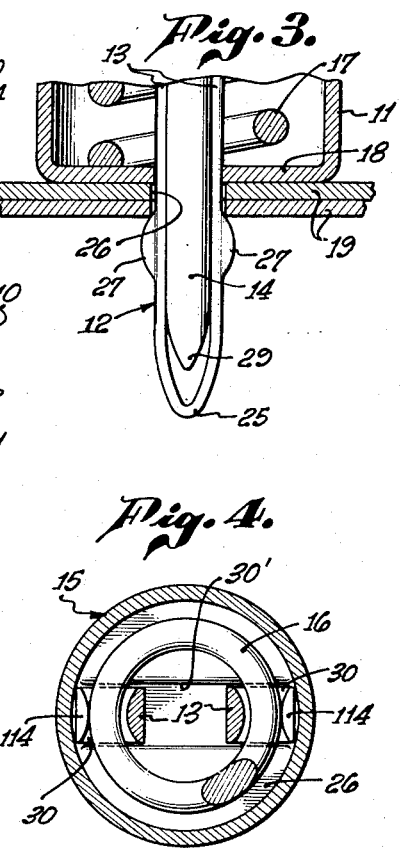
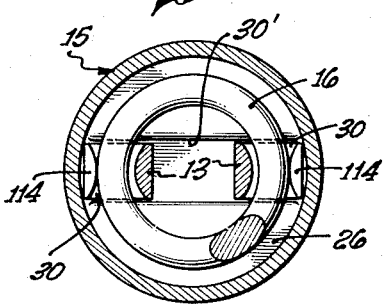
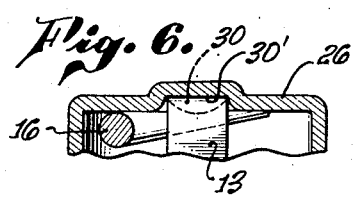
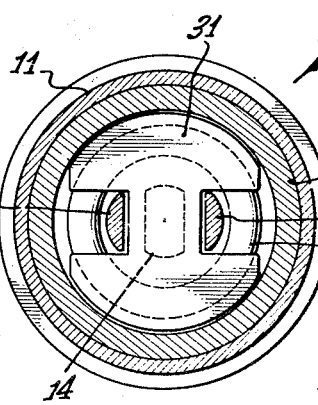
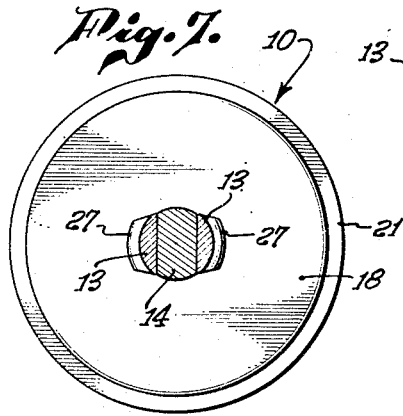
INVENTORS.
RALPH WALSH,
EARNEST E. MARTIN,
BY
ATTORNEY.

United States Patent Office 2,697,960
Patented Dec. 28, 1954

2,697,960

FASTENER WITH RESILIENT ARMS HAVING CONNECTED ENDS

Ralph W. Walsh, Westminster, and Earnest E. Martin, Pasadena, Calif.; said Martin assignor to said Walsh Application May 26, 1953, Serial No. 357,614

3 Claims. (Cl. 85—5)

This invention relates to improved clamps of the type commonly referred to as "skin clamps" or "temporary rivets," for retaining together a pair of metal sheets while they are being permanently riveted together.

Skin clamps as now in use comprise a body adapted to engage one of two sheets to be riveted, and a pair of elongated retaining elements or arms adapted to extend through alined rivet openings in the sheets and clamp the sheets against the body. The retaining elements desirably have one or more lateral projections for acting against the outer sides of one of the sheets, and are movable toward one another to a condition in which the projections may pass through the openings. In the active clamping condition of the device, an intermediate element is received between the two retaining elements to hold them in clamping positions and against movement toward one another. The retaining elements may be yieldingly urged in a clamping direction axially toward the body by a spring, usually located within the body.

One difficulty with prior clamps of this general type has been the tendency for the retaining fingers or arms to break or bend during insertion into or removal from the rivet holes. A major object of the present invention is to provide a clamp which is so constructed as to minimize the possibility of such finger breakage. At the same time, the present clamps are so constructed as to facilitate their insertion into a pair of rivet holes by presenting a single unitary preferably tapered end face at the ends of the retaining arms for insertion into the holes.

The above objects are achieved by securing together or integrating the two retaining arms at or near their outer hole-entering ends. Preferably, the two elements or arms are formed of a single elongated piece of material, which is doubled back essentially parallel to itself to form the two arms, and whose doubled end is insertible into the rivet holes. That doubled end of the arm forming material may then be tapered or rounded for easy insertion into the rivet holes. Being thus positively secured together or integrated at their outer ends, the two retaining arms act to reinforce and relatively position each other in a manner greatly strengthening the overall structure. The retaining elements are desirably formed of a resilient material such as spring steel, which may normally tend to urge the elements relatively apart and to clamping positions. One or both of the retaining elements may have a lateral projection for engaging the outer work sheet, which projection may be formed by merely laterally deforming the material of which the elements are made.

A further feature of the invention has to do with the manner in which the retaining arms and intermediate element are relatively actuated for clamping together and releasing a pair of sheets of material. Preferably, both the arms and the intermediate element are movable relative to the body of the device during clamping and release, with the intermediate element moving at a different rate than the arms, in order to assure a most effective clamping action and to facilitate use of a single clamp on different thicknesses of sheets. As will be brought out in greater detail at a later point, this differential rate of movement is attained by the operative interposition of different retracting spring means between the body and the intermediate element and between the intermediate element and retaining arms.

The above and other features and objects of the present invention will be better understood from the following detailed description of the typical embodiment illustrated in the accompanying drawing, in which:

Fig. 1 is an axial section through a skin clamp constructed in accordance with the invention;

Fig. 2 shows the clamp of Fig. 1 in condition for insertion into or removal from the alined rivet holes in a pair of sheets to be riveted together;

Fig. 3 is an enlarged fragmentary section through the lower portion of the clamp, showing the device in its active clamping condition;

Figs. 4, 5 and 7 are enlarged transverse sections taken on lines 4—4, 5—5 and 7—7 of Fig. 1; and Fig. 6 is an enlarged fragmentary section taken on line 6—6 of Fig. 2.

The illustrated skin clamp 10 includes a hollow body 11, within which is reciprocally mounted a retaining element 12 projecting downwardly through the lower end of the body. Element 12 forms a pair of essentially parallel retaining arms 13, between which is received an intermediate element 14 for maintaining the arms in clamping positions. A plunger 15 is slidably mounted in the upper end of body 11, and is adapted to actuate elements 12 and 14 downwardly against the resistance of a pair of inner coil springs 16 and 17.

Body 11 has a cylindrical side wall terminating downwardly in a transverse bottom wall 18 which may rest against the upper one of two metal sheets 19 to be riveted (see Fig. 3). Near its upper end, the side wall of body 11 has an annular flange 20 presenting an annular transverse downwardly facing shoulder 21, against which a clamp operating tool may exert upward force in actuating the clamp. Plunger 15 has a tubular vertically extending side wall presenting an enlarged diameter cylindrical lower portion 22 which slidably engages the inner surface of body 11. Above this increased diameter lower portion 22 of plunger 15, the upper extremity of body 11 is peened annularly inwardly at 23, to form an annular shoulder limiting upward movement of the plunger at the Fig. 1 position. The reduced diameter portion 24 of plunger 15 above its lower portion 22 slidably engages the shoulder forming portion 23 at the body. The plunger is thus positively and effectively guided for only axial sliding movement relative to body 11. The upper end of plunger 15 is closed by a transverse end wall 26, against which the upward yielding force of springs 16 and 17 is exerted.

Retaining element 12 is preferably formed of a single elongated strip of spring steel of the type used in forming leaf springs. This piece of spring steel is bent or doubled back on itself at its lower end 25, to form the two previously mentioned parallel vertically extending retainer arms 13. The lower end portion 25 of element 12 is desirably bent in a manner to present a downwardly tapering outer surface, to facilitate insertion of element 12 into the rivet holes 26 in sheets 19. At a location spaced above lower end 25, the arms 13 of element 12 are deformed to present thickened laterally projecting portions 27 which exert upward force against the underside of the lower sheet 19 (see Fig. 3) to clamp the sheets upwardly against bottom wall 18 of body 11. The outer surfaces of projections 27 may be curved as shown, to taper both upwardly and downwardly for wedging arms 12 relatively together during insertion through rivet holes 26.

The resilience of arms 13 tends to normally urge those arms and their projections 27 relatively apart to the separated clamping position of Figs. 1 and 3. During insection through rivet holes 26, arms 13 are deflectible relatively together to their Fig. 2 positions against the spring force of the arms themselves.

Element 14 is slidably mounted between arms 13, and in the Figs. 1 and 3 positions acts to retain clamping projections 27 of the arms against movement relatively together to their Fig. 2 positions. When arms 13 are moved downwardly relative to element 14, however, projections 27 are free for their movement relatively together for insertion into and out of the rivet holes. Element 14 preferably has a pair of opposite parallel planar side surfaces slidably engaging a pair of correspondingly parallel and planar inner surfaces of arms 13 at 28. The lower end 29 of element 14 may taper downwardly as shown.

At approximately the lower end of plunger 15, retainer arms 13 may be bent outwardly (at 113) so that the spacing between their upper portions is greater than between their lower portions. The two upper ends of arms 13 of retaining element 12 are turned oppositely and horizontally at 30, and may be received within a transverse recess 30' in upper wall 26 of plunger 15, to lock the retaining element against rotation relative to the plunger. The upper one of the two coil springs 16 is contained within plunger 15, and bears upwardly against its upper wall 26 and the upper horizontal portions of retaining element 12. Outwardly beyond their upper horizontal portions, arms 13 may extend downwardly a short distance, as at 114, to engage the outer sides of spring 16, and thus retain the arms in spread condition. The lower spring 17 is axially aligned with the upper spring, and bears downwardly against bottom wall 18 of the body.

Axially between the two springs 16 and 17, element 14 has an upper head 31, which is urged downwardly by the upper spring 16, and urged upwardly by the lower spring 17. This head may extend in a pair of diametrically opposite directions from the main portion of element 14, (see Fig 5), and be engaged at opposite axial sides by springs 16 and 17. The dimension of head 31 transversely of body 11 may be only slightly less than the internal diameter of plunger 15, to slidably guide element 14 for its axial movement within the clamp body and plunger. Preferably, the two coil springs are under a certain amount of compression at all times, even in the Fig. 1 condition of the clamp. The two springs 16 and 17 may typically be of identical construction.

When the clamp is not in use, the resilience of springs 16 and 17 urges retaining element 12, intermediate element 14, and plunger 15 to the Fig. 1 retracted positions. When the clamp is to be inserted into an active position within a pair of rivet holes in two sheets such as those indicated at 19, the parts of the clamp are actuated to their Fig. 2 positions by a clamp operating tool of the type commonly used with such clamps. This tool (not shown) bears upwardly against shoulder 21 of the clamp body, and downwardly against the upper end of plunger 15, to actuate the plunger and elements 12 and 14 downwardly relative to body 11 against the tendency of springs 16 and 17. Because the actuating head 31 of element 14 is received axially between the two springs 16 and 17, element 14 is actuated downwardly at a rate which is slower than the rate of downward actuation of retaining element 12. Projections 27 of element 12 are thus moved downwardly beyond element 14, so that the projections may be passed through rivet holes 26 in sheets 19. With the projections at the underside of sheets 19, and with housing wall 18 engaging the upper side of the upper sheet, the clamp operating tool is released to a condition in which elements 12 and 14 retract upwardly against the underside of the bottom sheet (see Fig. 3). In this condition, intermediate element 14 retains projections 27 against movement relatively together, and projections 27 thus clamp sheets 19 tightly against the bottom wall 18 of body 11. To release the clamp, the operating tool is again actuated to move the plunger and other parts to their Fig. 2 positions, in which retaining element 12 may be withdrawn upwardly through holes 26.

It has been found that the differential movement of elements 12 and 14 which is accomplished by the illustrated spring arrangement permits the clamp to be utilized with sheets of a wide variety of different thicknesses, whereas previous clamps not having this differential type of movement have been relatively limited with regard to the sheet thickness which could be clamped. In most prior clamps, the inner member corresponding to element 14 has been fixed against axial movement relative to the body, and as a result the total permissible thickness of the clamped sheets has been definitely limited by the effective length of that inner member. More specifically, the sheet thickness has had to be sufficiently small to permit the inner member to extend entirely through and somewhat beyond the fastened sheets, in order to effectively space the retainer arms apart in the applied condition of the clamp. In the present arrangement, on the other hand, the inner element 14 is not fixed against axial movement, but instead is automatically movable in a manner varying its effective length in accordance with the thicknesses of different sheets being clamped. As will be apparent from the construction of the present clamp, when the clamp is applied to a particular pair of sheets, element 14 automatically projects from the body a distance which is directly dependent upon the thickness of the sheets being clamped. The thicker the sheets, the greater is the effective length of element 14, to thus give to the device an extremely wide usable range.

We claim:

1. A skin clamp comprising: a body; a clamping member including two spaced generally parallel yieldable arms projecting outwardly from said body and interconnected by a continuous return bend at their outer ends, said arms being movable longitudinally outwardly of said body and being adapted to extend snugly through registering openings in a pair of sheets, each of said arms having a thickened portion defining a lateral locking projection inwardly of said return bend, said projections defining forward and rearward camming shoulders on said member engageable wtih the edges of the sheet openings for effecting deflection of said arms toward each other at said projections to enable insertion and withdrawal of said clamping member through the sheet openings, said rearward camming shoulders being adapted to bear inwardly against the side of the outer of the sheets to clamp the latter against said body, said arms having generally parallel portions extending forwardly a considerable distance from said forward shoulders to said return bend to avoid large bending stresses in the latter during said deflection, said arm portions defining with said return bend a pilot end for said clamping member insertable freely into the sheet-openings until said forward shoulders engage the edges of the opening in the inner sheet; means for urging said arms inwardly of said body; and spacer means projecting outwardly from said body between said arms, said spacer means extending at least to a location laterally opposite said projections when said clamping member is operatively clamping a pair of sheets for preventing said deflection on the application of a withdrawal force to said clamping member.

2. A skin clamp comprising: a body; a clamping member including two spaced generally parallel yieldable arms projecting outwardly from said body and interconnected by a continuous return bend at their outer ends, said arms being movable longitudinally outwardly of said body and being adapted to extend snugly through registering openings in a pair of sheets; each arm being thickened inwardly of said return bend to form a lateral projection having at both ends thereof an abrupt camming shoulder extending angularly from the arm surface, said shoulders being engageable with the edges of the sheet openings for effecting deflection of said arms toward each other at said projections to enable insertion and withdrawal of said member through the sheet openings, the rearward of said shoulders being adapted to bear inwardly against the side of the outer of the sheets to clamp the latter against said body, said arms having elongated generally parallel portions extending forwardly from the forward of said shoulders toward said return bend to avoid large bending stresses in the latter during said deflection, said arm-portions defining with said return bend a pilot end for said clamping member of smaller maximum transverse dimension than said clamping member at said projections and insertable freely through the sheet openings until said forward shoulders engage the edges of the opening in the inner sheet; means for urging said arms inwardly of said body; and spacer means projecting outwardly from said body between said arms, said spacer means extending at least to a location laterally opposite said projections when said clamping member is operatively clamping a pair of sheets for preventing said deflection on the application of a withdrawal force to said member.

3. A skin clamp comprising: a body; a clamping member including two spaced generally parallel yieldable resilient arms projecting outwardly from said body and interconnected by a resilient continuous return bend at their outer ends, said arms being movable longitudinally outwardly of said body and being adapted to extend snugly through registering openings in a pair of sheets; an outwardly convex thickened portion on each of said arms defining a lateral projection thereon inwardly of said return bend, said projections having forward and rearward camming surfaces engageable with the edges of the sheet openings for effecting deflection of said arms toward each other at said projections to enable insertion and withdrawal of said member through the sheet openings, said rearward surfaces being adapted to bear inwardly against the side of the outer of the sheets to clamp the latter against said body, said arms having generally parallel portions extending forwardly from said projections toward said return bend to avoid large bending stresses in the latter during said deflection, said arm portions defining with said return bend a pilot end for said clamping member insertable freely through the sheet openings until said forward camming surfaces engage the edges of the opening in the inner sheet; means for urging said arms inwardly of said body; and spacer means projecting outwardly from said body between said arms beyond said thickened portions when said clamping member is operatively clamping a pair of sheets for preventing said deflection on the application of a withdrawal force to said clamping member, said arms and spacer means having interengaging flat surfaces opposite, and continuing toward said return bend beyond, the locations of said thickened portions.

References Cited in the file of this patent

UNITED STATES PATENTS

| Number | Name | Date |
|---|---|---|
| 2,191,412 | Pihl | Feb. 20, 1940 |
| 2,240,643 | Finkle | May 6, 1941 |
| 2,301,347 | Wallace | Nov. 10, 1942 |
| 2,313,358 | Periman | Mar. 9, 1943 |
| 2,386,967 | Mancini | Oct. 16, 1945 |
| 2,569,392 | Wallace | Sept. 25, 1951 |